E. NEUBAUR.
PROCESS OF MANUFACTURING ELECTRIC MEASURING INSTRUMENTS.
APPLICATION FILED JAN. 27, 1913.
1,246,308. Patented Nov. 13, 1917.
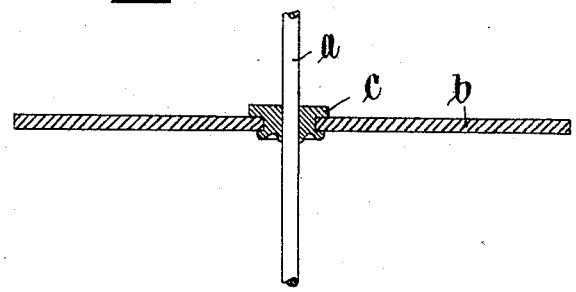
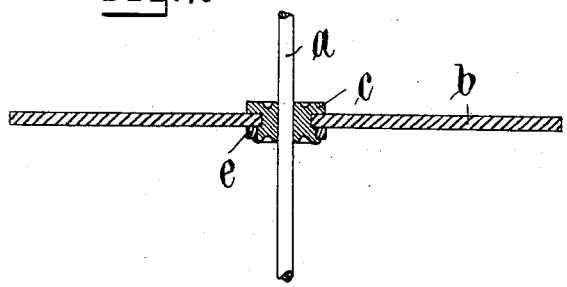
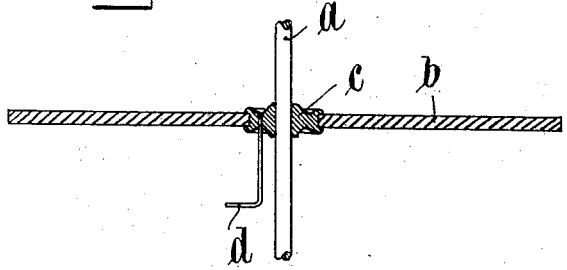
Witnesses.
Inventor
Erich Neubaur
Attorneys

UNITED STATES PATENT OFFICE.

ERICH NEUBAUR, OF CHARLOTTENBURG, NEAR BERLIN, GERMANY, ASSIGNOR TO THE FIRM OF H. ARON ELEKTRICITÄTSZÄHLERFABRIK G. M. B. H., OF CHARLOTTENBURG, NEAR BERLIN, GERMANY.

PROCESS OF MANUFACTURING ELECTRIC MEASURING INSTRUMENTS.

1,246,308.   Specification of Letters Patent.   Patented Nov. 13, 1917.

Application filed January 27, 1913. Serial No. 744,506.

*To all whom it may concern:*

Be it known that I, ERICH NEUBAUR, citizen of Germany, subject of the King of Prussia and Emperor of Germany, residing at Charlottenburg, near Berlin, in the Kingdom of Prussia and Empire of Germany, have invented new and useful Improvements in Processes of Manufacturing Electric Measuring Instruments, of which the following is a specification.

The present invention relates to electric measuring instruments of the kind in which a rotating disk or the like is employed and has for its object to provide improved arrangements for attaching and securing the disk to the shaft or spindle on which it is mounted which while effecting a rigid connection between the two elements shall be simple in character and of relatively light weight.

According to the present practice the shaft or spindle and the meter disk are usually arranged to be secured to each other either by means of a flange or bushing attached to the disk and provided with a setscrew or an alloy of tin is employed which is melted and cast around the shaft and disk so as to engage with both these elements upon cooling. A connection of this description is open to the disadvantage of requiring relatively large surfaces of contact between the shaft and disk owing to the comparatively small pressure which can be applied to insure frictional engagement between the elements to be connected. Furthermore such a method of connection involves a considerable addition to the weight of the moving element of the meter and necessitates a subsequent rectification or adjustment of the meter disk.

These disadvantages are obviated by the present invention which consists in providing a securing member interposed between the shaft and the disk to be concentrically attached thereto, the securing member being of annular form and preferably composed of soft metal, such for instance as copper. The securing member after being placed in position is deformed by pressure preferably applied in an axial direction, so as to engage securely with the edge of the aperture in the disk and with the shaft or spindle passing therethrough. It is found possible in practice by using a suitably high degree of pressure to cause the meter disk, shaft and securing member to become practically integral with one another.

An important advantage of the improved securing arrangement is that the securing member may be composed of aluminium since neither screws nor rivets are employed which are found to be unsatisfactory for use with aluminium in this connection.

The invention also permits the no-load stop or hook employed in certain cases to be readily and simply attached to the moving element of the meter, the small wire constituting the no-load stop being inserted in a hole in the securing member and gripped firmly by the latter when the deforming pressure above referred to is applied.

The invention is illustrated in the accompanying drawings, Figures 1, 2 and 3 of which are views in sectional side elevation of a disk and shaft secured together in accordance with the invention.

Referring now to the drawings the shaft of a measuring instrument, such for instance as an electric meter, is indicated at $a$ as connected to the disk $b$ of the meter by means of a securing member $c$, a no-load stop or hook where such is employed being indicated at $d$. In the construction shown in Fig. 1 the securing member comprises a metal ring $c$ the upper and lower faces of which are pressed or deformed into engagement with the disk $b$. In the modification illustrated in Fig. 2 the securing member $c$ is provided on one side with a washer $e$ interposed between the member $c$ and the disk $b$, the opposite side of the securing member $c$ being flanged as shown, this arrangement insuring a larger bearing surface between the disk and the securing member. The construction illustrated in Fig. 3 is similar to that shown in Fig. 2 except that the washer is omitted.

Having now described my invention what I claim and desire to secure by Letters Patent of the United States is:

1. A process of manufacturing electric measuring instruments comprising a movable element or disk having an aperture larger than the diameter of the shaft in the disk and being attached to a shaft or spindle by means of an annular securing member, consisting of producing the securing member of a soft metal, interposing said member between the edge of said aperture and said shaft, then pressing and deforming the upper and lower face of said member in such a manner that it will be engaged securely with the edge of the aperture in the disk and with the shaft.

2. A process of manufacturing electric measuring instruments comprising a movable element or disk having an aperture larger than the diameter of the shaft in the disk and being attached to a shaft or spindle by means of an annular securing member, consisting of producing the securing member of a soft metal, inserting a no-load stop therein, interposing said member between the edge of said aperture and said shaft, then pressing and deforming the upper and lower face of said member in such a manner that it will be engaged securely with the edge of the aperture in the disk and with the shaft.

In testimony whereof I have hereunto set my hand in presence of two subscribing witnesses.

ERICH NEUBAUR.

Witnesses:
   WOLDEMAR HAUPT,
   HENRY HASPER.

Copies of this patent may be obtained for five cents each, by addressing the "Commissioner of Patents, Washington, D. C."